(12) United States Patent
Mukherjee

(10) Patent No.: US 9,886,478 B2
(45) Date of Patent: *Feb. 6, 2018

(54) AVIATION FIELD SERVICE REPORT NATURAL LANGUAGE PROCESSING

(75) Inventor: Joydeb Mukherjee, Morristown, NJ (US)

(73) Assignee: HONEYWELL INTERNATIONAL INC., Morris Plains (*) Notice: Subject to any disclaimer, the term of this patent is extended or adjusted under 35 U.S.C. 154(b) by 775 days.

This patent is subject to a terminal disclaimer.

(21) Appl. No.: 13/115,006

(22) Filed: May 24, 2011

(65) Prior Publication Data

US 2011/0257839 A1    Oct. 20, 2011

Related U.S. Application Data

(63) Continuation-in-part of application No. 11/245,659, filed on Oct. 7, 2005, now Pat. No. 7,949,444.

(51) Int. Cl.
| | | |
|---|---|---|
| *G06F 7/00* | (2006.01) | |
| *G06F 17/30* | (2006.01) | |
| *B64F 5/60* | (2017.01) | |
| *B64F 5/40* | (2017.01) | |
| *G07C 5/08* | (2006.01) | |
| *G10L 15/26* | (2006.01) | |
| *G06F 17/27* | (2006.01) | |
| *G06F 17/28* | (2006.01) | |

(52) U.S. Cl.
CPC ........... *G06F 17/3043* (2013.01); *B64F 5/40* (2017.01); *B64F 5/60* (2017.01); *G06F 17/30401* (2013.01); *G07C 5/0808* (2013.01); *G10L 15/26* (2013.01); *G06F 17/277* (2013.01); *G06F 17/2785* (2013.01); *G06F 17/2881* (2013.01)

(58) Field of Classification Search
CPC .......... G06F 17/3043; G06F 17/30401; G06F 17/277; G06F 17/2785; G06F 17/2881; B64F 5/40; B64F 5/60; G01L 15/26; G07C 5/0808; F16H 2061/1208; B60W 50/0205
USPC .... 701/1, 3, 29.1, 33.4, 31.6–31.8; 704/1, 9, 704/4, 6, 7; 702/183, 185, 187
See application file for complete search history.

(56) References Cited

U.S. PATENT DOCUMENTS

| | | | |
|---|---|---|---|
| 4,692,896 | A | 9/1987 | Sakoda et al. |
| 4,914,590 | A | 4/1990 | Loatman et al. |
| 4,994,966 | A | 2/1991 | Hutchins |
| 5,128,865 | A * | 7/1992 | Sadler .............................. 704/2 |

(Continued)

OTHER PUBLICATIONS

Lafourcade, Mathieu. "Ant Algorithms, Conceptual Vectors and Fuzzy UNL Graphs." Convergence'03: International Conference on the Convergence of KnowledgeLanguage and Information Technologies. 2003.*

(Continued)

*Primary Examiner* — Chuong P Nguyen
(74) *Attorney, Agent, or Firm* — Lorenz & Kopf, LLP

(57) ABSTRACT

An aircraft service information handling system comprises an input module operable to collect field service narrative data. A natural language data extraction module extracts problem data and related solution data from the narrative data, and a database module populates an aircraft service information database with the extracted problem data and the related extracted solution data. The database module further searches the database for populated problem data, and retrieves the related populated solution data.

9 Claims, 4 Drawing Sheets

(56) References Cited

U.S. PATENT DOCUMENTS

| | | | |
|---|---|---|---|
| 5,259,067 A | | 11/1993 | Kautz et al. |
| 5,418,717 A | | 5/1995 | Sue et al. |
| 5,642,522 A | | 6/1997 | Zaenen et al. |
| 5,644,686 A | | 7/1997 | Hekmatpour |
| 5,708,829 A | | 1/1998 | Kadashevich et al. |
| 5,717,914 A | | 2/1998 | Husick et al. |
| 5,748,841 A | | 5/1998 | Morin et al. |
| 5,794,177 A | * | 8/1998 | Carus et al. .............. 704/9 |
| 5,890,103 A | * | 3/1999 | Carus ...................... 704/9 |
| 5,930,746 A | * | 7/1999 | Ting ........................ 704/9 |
| 6,122,575 A | * | 9/2000 | Schmidt ......... G06F 11/2252 244/1 R |
| 6,246,977 B1 | | 6/2001 | Messerly et al. |
| 6,356,864 B1 | | 3/2002 | Folz et al. |
| 6,446,081 B1 | | 9/2002 | Preston |
| 6,571,236 B1 | | 5/2003 | Ruppelt |
| 6,609,091 B1 | | 8/2003 | Budzinski |
| 6,675,159 B1 | * | 1/2004 | Lin et al. |
| 6,725,137 B2 | * | 4/2004 | Eagleton et al. ......... 701/32.9 |
| 7,260,505 B2 | * | 8/2007 | Felke et al. ............. 702/187 |
| 7,720,674 B2 | * | 5/2010 | Kaiser et al. ............... 704/9 |
| 7,788,002 B2 | * | 8/2010 | Yukawa ......... G05B 23/0267 340/853.2 |
| 7,823,062 B2 | * | 10/2010 | Liberty et al. ............ 715/234 |
| 7,869,906 B2 | * | 1/2011 | Louch ............... H04L 12/66 701/1 |
| 8,219,519 B2 | * | 7/2012 | Chakrabarty et al. ...... 707/602 |
| 8,489,601 B2 | * | 7/2013 | Rajpathak ........ G06F 17/3071 707/736 |
| 2002/0091756 A1 | * | 7/2002 | Goodwin ................. 709/203 |
| 2003/0105638 A1 | | 6/2003 | Taira |
| 2003/0158736 A1 | | 8/2003 | James et al. |
| 2003/0217052 A1 | * | 11/2003 | Rubenczyk ...... G06F 17/30643 |
| 2004/0003318 A1 | * | 1/2004 | Felke et al. ................ 714/25 |
| 2004/0039499 A1 | * | 2/2004 | Felke et al. ................ 701/29 |
| 2005/0043940 A1 | * | 2/2005 | Elder ............... G06F 17/3043 704/9 |
| 2005/0131874 A1 | | 6/2005 | Verbitsky |
| 2008/0033714 A1 | * | 2/2008 | Gupta ........................ 704/9 |
| 2009/0326758 A1 | * | 12/2009 | Ramanathan et al. ......... 701/33 |
| 2013/0290317 A1 | * | 10/2013 | Spivack et al. ............ 707/723 |

OTHER PUBLICATIONS

USPTO Office Action for U.S. Appl. No. 11/245,659; dated Oct. 15, 2008.
Response to USPTO Office Action; dated Jan. 15, 2009.
USPTO Office Action for U.S. Appl. No. 11/245,659; dated Feb. 27, 2009.
Response to USPTO Office Action; mail date Jun. 29, 2009.
USPTO Office Action for U.S. Appl. No. 11/245,659; dated Aug. 24, 2009.
Response to USPTO Office Action; mail date Oct. 28, 2009.
USPTO Office Action for U.S. Appl. No. 11/245,659; dated Mar. 9, 2010.
RCE filing; mail date Apr. 20, 2010.
Response to USPTO Office Action; mail date Apr. 20, 2010.
USPTO Office Action for U.S. Appl. No. 11/245,659; dated Jul. 12, 2010.
Response to USPTO Office Action; mail date Jul. 28, 2010.
USPTO Office Action for U.S. Appl. No. 11/245,659; dated Oct. 28, 2010.
Response to USPTO Office Action; mail date Dec. 17, 2010.
USPTO Notice of Allowance; mail date Jan. 19, 2011.
Mukherjee, J.; Reference to be Placed in File; mail date Apr. 7, 2011.
Carreras, X., et al., Lecture Notes in Computer Science, vol. 2430, Learning and Inference for Clause Identification, Proceedings of Machine Learning: ECML 2002: 13th European Conference on Machine Learning, Helsinki, Finland, Aug. 19-23, 2002, (2002), 35-47.
Ganesan, P, et al., Exploiting Hierarchical Domain Structure to Complete Similarity, ACM Transactions on Information Systems, 21(1), (2003), 64-93.
Leffa, V.J., Clause Processing in Complex Sentences, Proceedings of the First International Conference on Language Resources and Evaluation, vol. 2, http://www.leffa.pro/br/granada.htm, (1998), 937-943.
Nenadic, G. et al., Automatic Discovery of Term Similarities Using Pattern Mining, Proceedings of the 2nd International Workshop on Computational Terminology (CompuTerm 2002), (2002), 43-49.
Lafourcade, M. et al, Ants for Natural Language Processing, 1-22.

\* cited by examiner

AVIATION FIELD SERVICE REPORT NATURAL LANGUAGE PROCESSING

This is a continuation-in-part of U.S. application Ser. No. 11/245,659, filed Oct. 7, 2005.

FIELD OF THE INVENTION

The invention relates generally to managing aviation field service data in a service record, and more specifically to natural language process extraction of data from service reports and management of such data in a maintenance information database.

BACKGROUND

Maintenance of aviation equipment is a significant expense for any aircraft owner, and is a primary concern for safety of the aircraft. While an automobile that experiences mechanical trouble such as an engine problem can usually pull the vehicle over and wait for repairs to be made, a similar engine failure in an aircraft flying at tens of thousands of feet can be more troublesome. For this reason, regular maintenance and service of aviation engines and other such aircraft systems is mandated by federal agencies, and is performed regularly to ensure the reliable operation of the airplane.

Because the equipment, parts, and labor involved with aircraft maintenance are all relatively expensive, aircraft operators desire to minimize the cost involved while ensuring that their aircraft remain safe and reliable. Because it is difficult and potentially unsafe to try to cut costs on parts or on maintenance equipment, some of this effort in controlling cost is directed toward reducing labor by keeping fault diagnosis and related maintenance operation costs to a minimum. This can be achieved by good engineering of the aircraft and its systems, and by good training or extensive experience for the maintenance personnel servicing the aircraft. Fast and efficient diagnosing of a problem results in a decrease in time and labor spent fixing a given problem, and results in a reduction of resource consumption such as service hangar time and loss of the aircraft for normal flight operations.

The maintenance personnel typically generate what are known as field service reports, or FSRs, to document their service work in diagnosing and repairing an aircraft fault. The field service report typically comprises an unstructured written narrative that describes the symptoms observed that indicated service was necessary, the actions taken in diagnosing and repairing the aircraft, the parts and equipment used, and the eventual solution to the fault. This information serves as a record of what has happened, and as an indicator of what may work to solve problems having certain symptoms or that are diagnosed based on certain observations or problems.

It is therefore desired to more effectively use aviation field service report data to make service of aircraft more efficient and cost-effective.

SUMMARY

In one example embodiment of the invention, an aircraft service information handling system comprises an input module operable to collect field service narrative data. A natural language data extraction module extracts problem data and related solution data from the narrative data, and a database module populates an aircraft service information database with the extracted problem data and the related extracted solution data. The database module further searches the database for populated problem data, and retrieves the related populated solution data.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One embodiment of the invention comprises an aircraft service information handling system having an input module operable to collect field service narrative data. A natural language data extraction module extracts problem data and related solution data from the narrative data, and a database module populates an aircraft service information database with the extracted problem data and the related extracted solution data. When a user has identified a problem with an aircraft and seeks maintenance information, the user uses the database module to search the database for populated problem data, and retrieves the related populated solution data. The user the is able to use the retrieved solution data as a resource in troubleshooting and repairing the aircraft problem.

Figure 1:
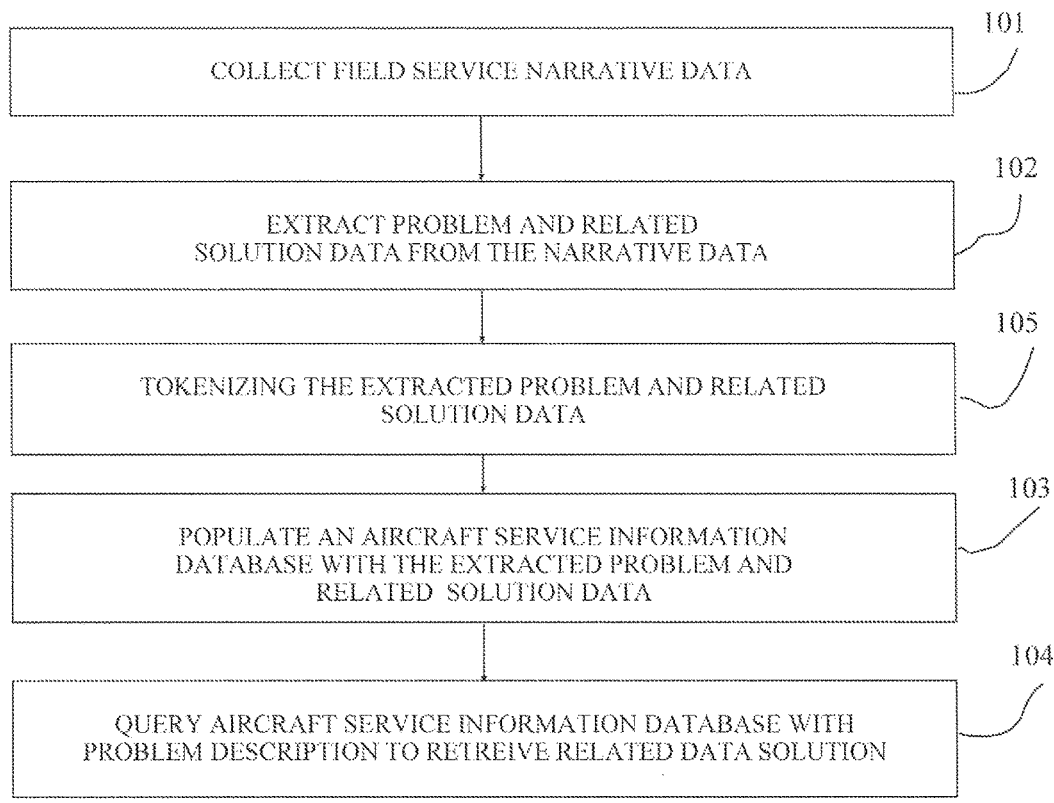
FIG. 1 is a flowchart of a method of manufacturing paper, consistent with an example embodiment of the present invention.

FIG. 1 is a flowchart illustrating a method of practicing one example embodiment of the invention. At 101, field service narrative data is collected. The field service narrative data is typically a handwritten description of a problem and a solution to the problem that a service technician drafts as a record of repair or maintenance activity when servicing an aircraft, but in other embodiments is a spoken or typed narrative that is converted to a computer-readable form such as by voice recognition. The narrative in various environments will comprise sentence fragments or phrases, along with full sentences, descriptive words, and other narrative elements. It is also common for such narratives to contain abbreviations and slang terms, such as using "chk" to represent the word "check" or "checked", and "repl" to represent "replaced" when referring to maintenance or repair operations. Similarly, test equipment and parts may be referred to using slang terms rather than the official technical terms.

The narratives are also likely in many environments not to be grammatically correct, making extraction of problem and related solution data from the narrative data at 102 a more complex task. The unstructured narrative text is in one embodiment of the invention processed via software executing on a computerized system, using algorithms designed to parse the constituents of natural language. The natural language processing algorithms in a further embodiment use training material to learn to distinguish words, phrases, or sentences relating to problem or symptom identification from those related to the solutions to problems. A database management function is able to categorize the problem or symptom, and to assign the problem and the related solution to a particular problem category. The stored problem and related solution data can then be searched using a language search or category search to retrieve solutions for problems similar to one a user is experiencing.

At 103, the problem and solution data extracted from the narrative are used to populate an aircraft service information database. In a further embodiment, known common problems and solutions are further entered into the aircraft service information database to provide an initial knowledge base from which the database is further built based on the collected field service narrative data.

When a service technician is having difficulty diagnosing a problem, the technician can use symptom or problem descriptions to search the aircraft service information database, and can retrieve those problems and solutions most related to the observed problem or symptoms at 104. Alternately, the service technician can browse problems and their solutions using the problem categorization or classification as determined in the natural language processing and as stored along with the problem and solution data.

Figure 2:
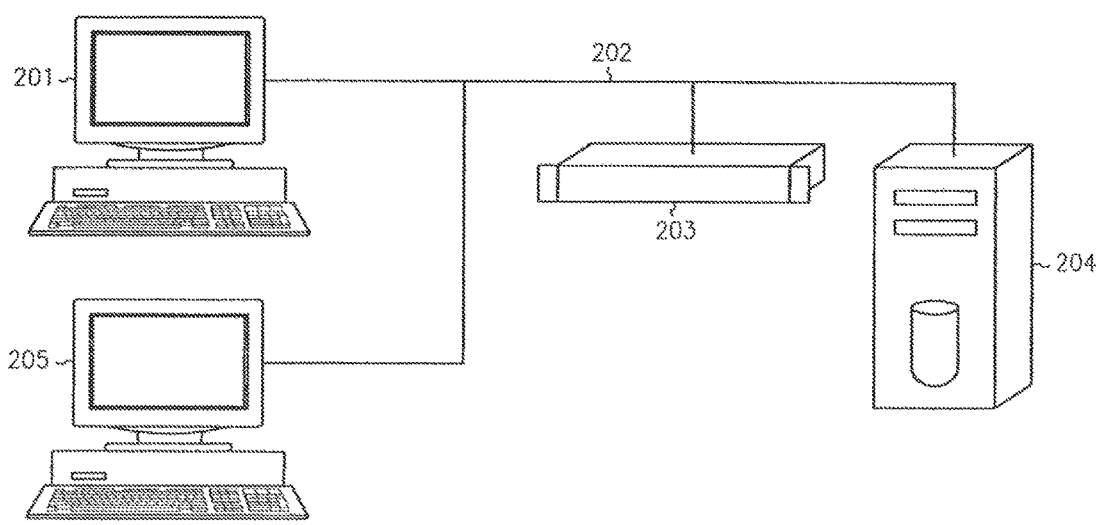
FIG. 2 is a block diagram of data utilization in a method of managing production of paper, consistent with an example embodiment of the present invention.

FIG. 2 shows an information handling system as may be used to practice an example embodiment of the invention. A first computer system 201 is used to record field service report data. In one embodiment, the field service report data is typed into the computerized system, such as by the service technician, from written notes, or as a transcription of a recorded vocal narrative. The computer system 201 sends the narrative data via a network 202 to a second computerized system 203, where natural language processing algorithms are employed to analyze the narrative and extract problem and related solution data. The problem data and the related solution data are then saved in a database in database server 204.

When a service technician is having difficulty diagnosing a problem, the technician can use a terminal 205 to query the data on database server 204. In one example, this is performed by entering one or more words or phrases describing the problem or symptoms. The description of the problem is sent to the database server, which compares the problem data stored in the database to the problem description the service technician submitted as a query. The database server then searches the database for those problem and related solution records that are most similar to the service technician's problem description, and displays the records found. The service technician can then view the solutions related to those problems most like the problem the technician is presently facing, and can benefit from the knowledge and experience of other service technicians.

Figure 3:
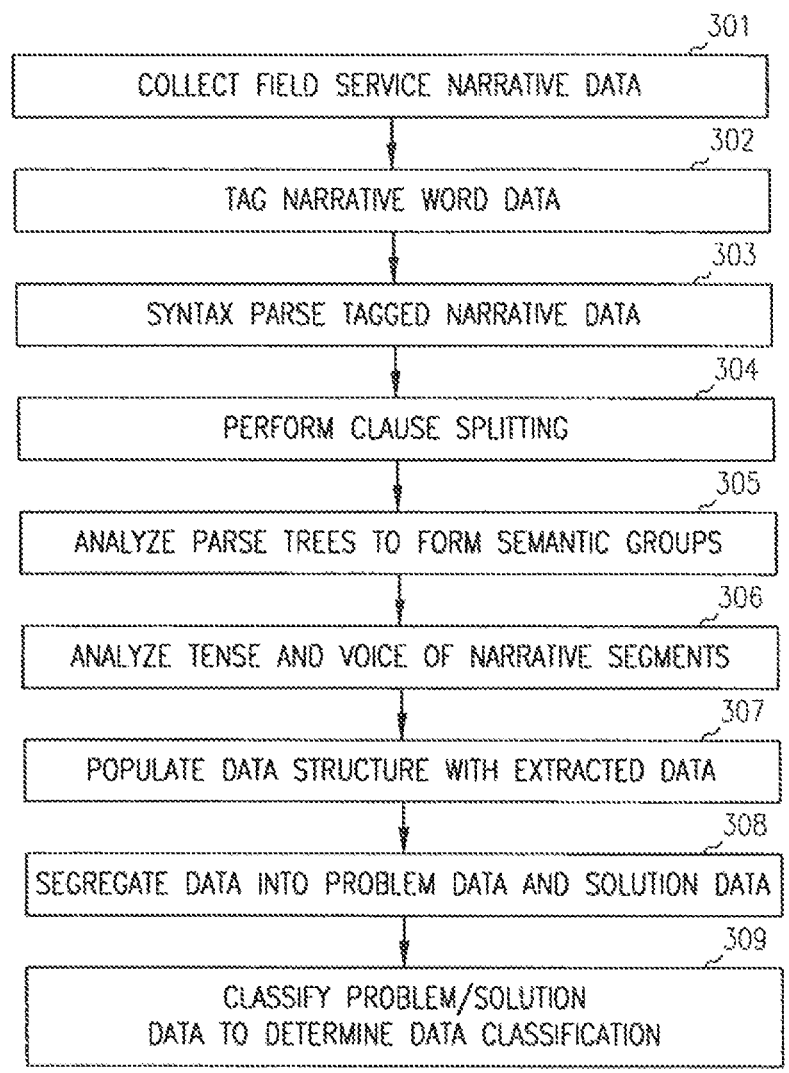
FIG. 3 is a detailed flowchart of a method of producing paper products, consistent with an example embodiment of the present invention.

FIG. 3 is a detailed flowchart of a method of practicing an example embodiment of the invention. At 301, field service narrative data is collected as at 101 of FIG. 1. At 302, the collected narrative data is tagged, as a part of the natural language processing function. The tagging process typically identifies each part of speech in the sentence, and in some further embodiments especially tags words such as "an", "or", and "the" that don't add meaning to a sentence or phrase. In some embodiments, the tagger will do a lexical analysis to determine which part of speech a particular word is, such as determining whether the term "running" is a noun, adjective, adverb, or gerund. The narrative is then parsed at 303 based on the syntax of the phrase or sentence, based on grammatical rules and statistical probabilities. After the parsing process is performed, clause splitting is performed at 304, to break the narrative up into independent clauses or phrases. Semantic groups within each clause or phrase are determined at 305, such that the various parts of speech in the clause are identified and can be grouped. At 306, characteristics of the parts of speech are identified, such as identifying a verb tense to determine whether an action has been completed, is being completed, or is to be completed.

The data extracted from the narrative is used to populate frames or other data structures at 307. The frames reference each linguistic element of a phrase or sentence, and store its apparent relation to other elements of the clause or sentence. The frame data is then manually segregated into problem data and associated solution data at 308, and is classified at 309 for use in populating a database or knowledge base of problems and their solutions. In a further embodiment, the frame data is automatically processed via an algorithm to determine based on lexical, syntactic, and semantic indicators which one of a number of categorized problem types to which the problem and related solution data are to be assigned.

The database of compiled problem data and associated solution data is employed in yet a further embodiment as a resource which a service technician may query for problems similar to a problem presently under investigation, so that the solutions to the found related problems can be considered in formulating a solution to the present problem. One example of such a system is shown and described in conjunction with FIG. 2, which illustrates how a service technician using a remote system such as 205 may query a database constructed from narrative data provided via a first terminal 201 through a database server 204.

Figure 4:
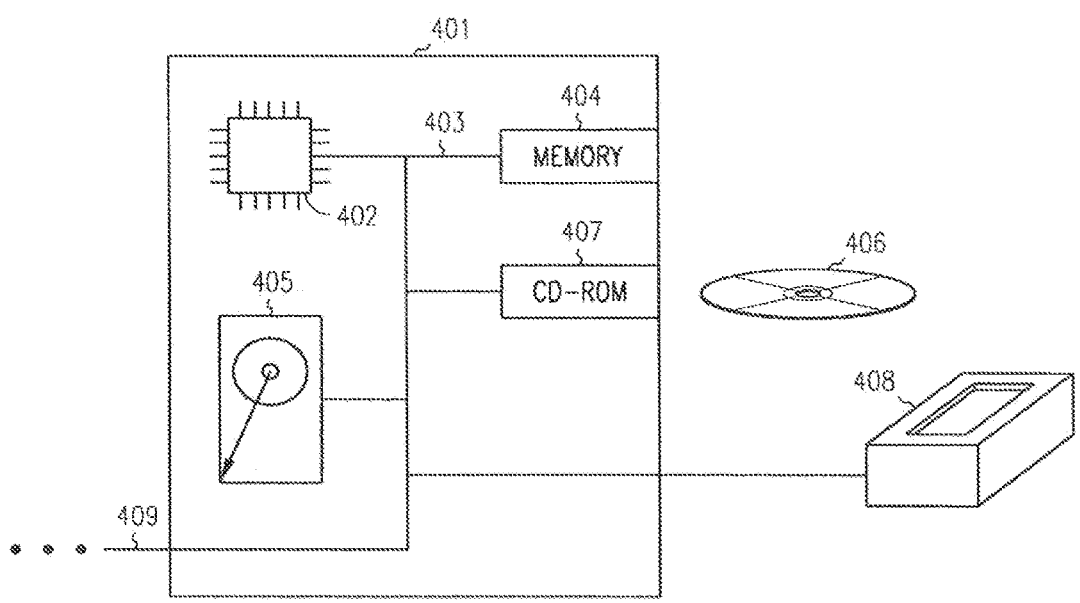
FIG. 4 is a block diagram of a computerized system, operable to execute machine-readable instructions for carrying out an example embodiment of the present invention.

FIG. 4 illustrates a more detailed example of a computerized system consistent with an example embodiment of the present invention. The computer 401 has a processor 402, couple via bus 403 to memory 404. A hard disk drive 405 stores program instructions and other data such as a database, such that the data can be retrieved from the hard disk drive and loaded into memory 404 for the processor 402's use. Some data stored on the hard disk drive, such as software or program application data is loaded from a machine-readable medium such as a compact disc 406, a diskette, a DVD, a network connection 409, or another such machine-readable medium via a media reader such as CD-ROM drive 407. A scanner 408 is further attached to the computerized system in this example, and is operable to scan papers and to send an electronic representation of the scanned images to the computerized system 401.

In operation, execution of a software program installed onto the computer system from a machine-readable medium causes at least a portion of the program to be loaded from the hard disk drive 405 into memory 404. The processor executes instructions comprising a part of the computer program, which causes the computer to perform the functions as dictated by the instructions. For example, one portion of such a software program will cause scanner 408 to scan field service reports, and to perform character recognition on at least a portion of the scanned image to create a machine-readable version of the field service report narrative. Other functions consistent with various embodiments of the invention, such as performing natural language processing functions and operation of a database of problems and their related solutions, are performed by the processor through execution of program instructions loaded into the processor from machine-readable mediums such as the CD-ROM 406, hard disk drive 405, and memory 404.

Figure 5:
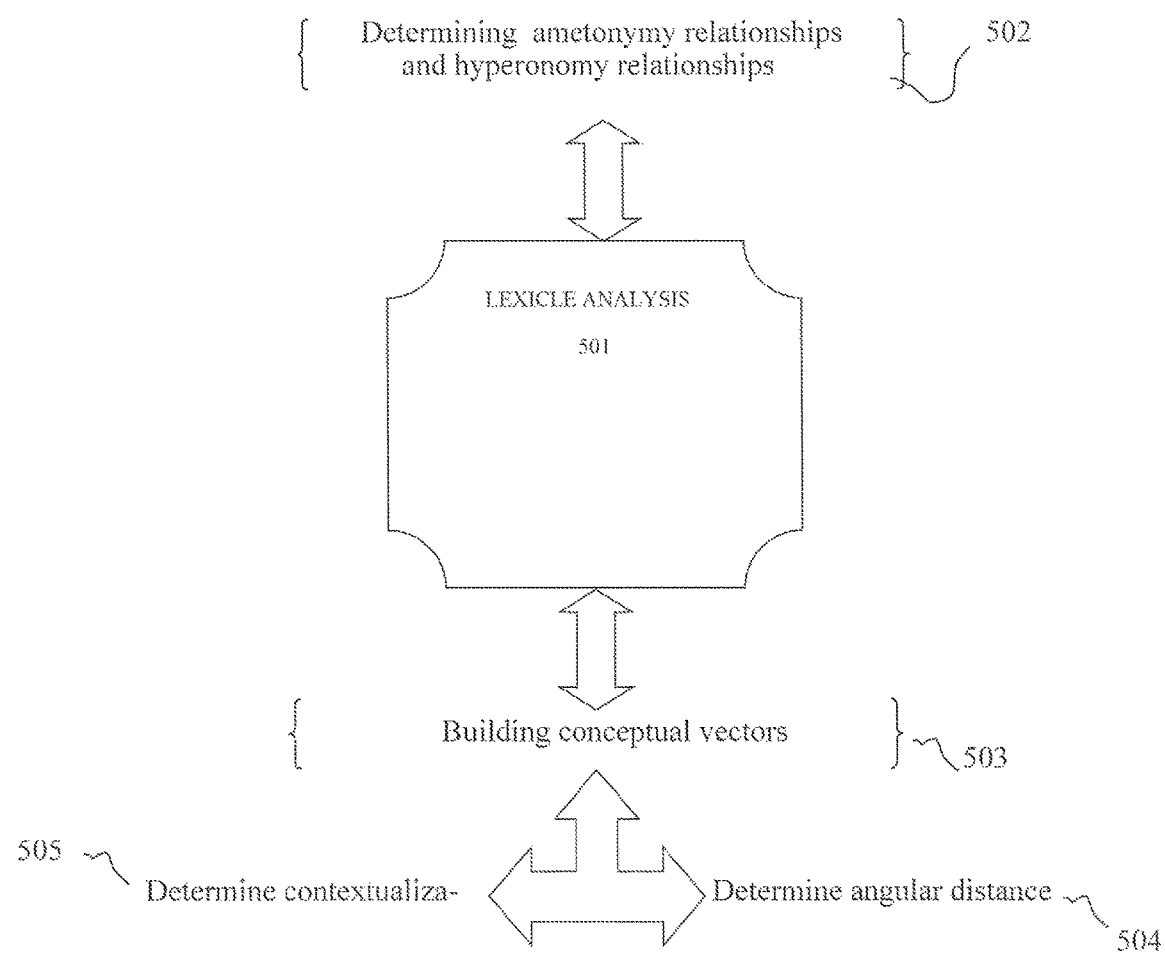

FIG. 5 illustrates salient points of addition or refinements with respect to the methods disclosed above:

1) When unstructured natural language narratives written by field service engineers (i.e., field service reports or in blogs) as well as technical manuals are available for mining of data and extraction and organization of knowledge with respect to problem instance and solution instance, the scenario may be represented at a very high level of abstraction in the following form. A set of symptoms and a set of problems form a bi-partite graph. Two or more problems may share one or more common symptom(s) and typically more than one symptom characterize a problem. Also, the set of problems and a set of repair actions (and/or test procedures) form another bi-partite graph. Solution of one problem may call for more than one repair actions (and/or test procedures) and one repair action (and/or test procedures) may be associated with more than one problem. This gives rise to ambiguity beyond that caused by flexible and imprecise nature of unstructured narrative.

2) Syntactic elements are extracted based on methods disclosed above ensuring meaningful fragments are present. They constitute one type of feature among many. Apart from providing aforesaid features Syntactic analysis is performed with a view to its subsequent use for Semantic analysis (i.e., one level of Semantic analysis is closely coupled and dependent on syntactic analysis).

3) Semantic Roles (SR), also known as Thematic Roles, are identified and wherever possible mapped to corresponding Syntaxes (e.g. Noun or Noun Phrases). This helps a great deal in disambiguation of meaning. Additional detail on Semantic analysis may be found in "*Natural Language Processing for the Semantic Web*," Paul Buitelaar Digital Enterprise Research Institute, herein incorporated by reference in its entirety.

4) Performing pragmatic analysis to understand inter-sentential meaning and relationship among concepts with the help of "contextualization metrics." Usually "Semantic analysis" is confined to uncovering meaning of a particular sentence and not in relation to other sentences. Pragmatic analysis is required to take care of inter-sentential meaning and relationships.

5) When multiple faults are present (or hypothesized from the observed symptoms) more than one test procedures and/or repair actions have to be performed. Such a sequence of actions is suggested as will economize on performance of test procedures.

The following constitutes the steps for how to use natural Language processing algorithms to arrive at actionable decisions towards aircraft maintenance:

Collecting unstructured field service narrative data (and/or possibly those available in community blogs) together with technical manuals utilizing self-training natural language processing algorithms;

Performing tokenization (i.e., word segmentation) 105 (See, FIG. 1): In English language usually space and punctuations demarcate word and sentence boundaries;

Performing a lexical analysis as disclosed above;

Automatic assigning or tagging of descriptors to the given tokens. The descriptor is called a tag. The tag may indicate one of the parts-of-speech, semantic information, and so on. So tagging is a kind of classification. For Example the following sentence may be tagged as follows:

Hot engine was making unusual noise.

$engine_N$, $hot_{Adj}$, $making_V$, $unusual_{Adj}$, $was_{Aux}$, $noise_N$

For words with multiple meanings, words may be tagged as follows:

Example: Bank of filters $Bank_{collection}$ as opposed to $Bank_{financial}$ or $Bank_{River}$.

Performing syntactic analysis. Syntax is the level at which we study how words combine to form phrases, phrases combine to form clauses, and clauses join to form sentences. It also helps to determine relational categories like subject, predicate, object etc in a sentence when analyzed in conjunction with the finite set of verb patterns.

Performing semantic analysis 502. Semantics is addressed by considering relationships among lexical classes (e.g. Metonymy or "part-of relationship), Hyperonymy or ("is-a" relationship). An example of Meronymy is "a compressor is a part of an aircraft engine". An example of Hyperonymy is "a turbo-fan engine is an en engine." Additional information on Metonymy and Hyperonymy may be found is "*Conceptual Vectors and Fuzzy Templates for Discriminating Hyperonomy (is-a) and Meronymy (part-of) Relations*" by Mathieu Lafourcade, herein incorporated by reference in its entirety.

However, there are other aspects of semantics based on semantic roles/thematic roles and contextualization metrics and customization thereof for the domain in question. For instance conceptual vectors may be built 503. Given a set (C) of concepts (n) (i.e. words); a conceptual vector is a linear combination of elements ($c_i$) of (C). Following relations hold between two conceptual vectors X,Y, their contextualizations and their angular distances.

$$D_A(\Gamma(X,Y),\Gamma(Y,X)) \leq \{D_A(X,\Gamma(Y,X)), D_A(\Gamma(X,Y),Y)\} \leq D_A(X,Y)$$

Where $D_A(X,Y)$ stands for the angular distance between two concept vectors X and Y and $\Gamma(X,Y)$ stands for the contextualization of X by Y.

Definitions of both angular distance 504 and contextualization 505 may be found in "*Ants for Natural language Processing*" by Matheu Lafourecade and Frederic Guinand, which is incorporated herein by reference in its entirety. Angular distance is a similarity measure and where there is a function of similarity between concept A and concept B, the Angular distance between word A and Word B may be described as:

$$D_A(A,B) = \arccos(Sim(A \cdot B)), \text{ with}$$

$$Sim(A,B) = A \cdot B / (\|A\| \times \|B\|).$$

Contextualization is the concept that when two words or terms are in the presence of each other, some of the meaning of each of them is thus selected by the presence of the other, acting as a context. Intuitively, contextualization operation brings X closer to Y in proportion to their intersection. This type of analysis is a means of amplifying properties that are salient in a given context.

Semantic roles are assigned to nouns and noun phrases according to the relation they hold with the verb. Only certain syntaxes are associated with specific roles. On the other hand, any verb admits of only certain types of syntaxes (or grammatical relations) and certain types of semantic relations. We can exploit these facts to figure out from the syntaxes possible semantic roles and meaning therefrom.

Commonly used Semantic Roles include but are not limited to:

Agent: A doer or actor and is a subject in active sentences; prepositioned with "by" in passive sentences;

Patient/theme: An entity affected by deed of an agent or other cause and are objects of transitive verbs and subject of non-action verbs;

Location: Location of deed/event;

Instrument: An entity employed by an agent in a deed, as a subject in active sentences with no agent or as a preposition "with;"

Time: The time of deed/event;

Recipient Receiver of the result of a deed of an agent which is an indirect object with transitive verbs and is prepositioned by "for;"

Experiencer: The perceiver of a stimulus and is an animate subject in active sentences with no agent;

Stimulus: An entity perceived/experienced by an experiencer;

Cause: A cause that is not an agent and is non-volitional or non intentional;

Goal: A targeted location, purpose or "finality;"

Some examples of semantic relationships may include:
1) Grammatical Relation: Subject-Verb-Object
   Semantic Relation: Agent-Verb-Patient
   "A Mechanic(Agent)-opened(Verb)-a box of tools(Patient).
2) Grammatical Relation: Subject-Verb-Object(indirect)-Object(direct)
   Semantic Relation: Agent-Verb-Patient-Recipient
   She(Agent)-gave (Verb)-money(Patient)-to the-United Fund(Recipient)
3) Grammatical Relation: Subject-Verb(state-of-being)
   Semantic Relation: Patient-Verb(state-of-being)-Manner Adverb
   Gears-wear-easily Performing pragmatic analysis. To uncover the meaning of the particular sentence in the context. Pragmatic analysis is performed using contextualization vectors in analogous ways to those used for semantic analysis discussed above. Here the context is other sentences and not phrases and/or clauses appearing in the same sentence. For Example:

"Engineer went to the site to study the problem."
Here, "site" may mean WebSite or where the aircraft maintenance is taking place. Study may mean reading from the WebSite or observing the physical problem. Although, both the meanings are applicable for aircraft maintenance only Pragmatic Analysis reveals which one is to be adopted by analyzing inter-sentential meaning.

As another example:
"Accumulated water was from bank [of filters]."
Here "bank" is ambiguous, more so because of omission of "of filters" and presence of word "water". Disambiguation has to be performed from the analysis of discourse from between $Bank_{collection}$ and $Bank_{river}$. A third sense $Bank_{financial}$ is ruled out because a low probability assigned during the tagging process discussed above. One can readily appreciate that an analysis of individual sentence alone will not do because both of the remaining uses of the word Bank are logical. To determine the intended meaning of the particular sentence in the intended context, contextualization vectors may be in analogous ways to those used for semantic analysis discussed above. Here, the context is another sentence and not a phrases and/or clauses that appears in the same sentence.

All the aforesaid steps of NLP procedures are buttressed by employing, wherever possible, empirical approaches based on collection of statistics from large volume of data available(i.e., a corpus) in the steps of tagging, alignment, collocation, word-sense-disambiguation etc. These approaches complement each other and help particularly in cases where initially the field service reports are not volumetrically adequate in numbers thereby making the system more robust. Note that, out of three possible sources of information, namely, field service reports, web blogs and technical manuals, any one or two may be not present or adequately present and our algorithm should be robust enough to produce reliable results under these circumstances.

The example embodiments presented here illustrate how aircraft service information can be managed to provide a database of problems and their related solutions, and how such a database can be formed by natural language processing of field service report narratives. Such a system enables service technicians to benefit from the knowledge and experience of others, and provides for easy and efficient assembly of a repository of problem and repair knowledge. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A method of managing aircraft service information, comprising:
   collecting, by a processor, unstructured field service narrative data from a field service report utilizing self-training natural language processing algorithms;
   extracting, by the processor, problem data from the narrative data;
   extracting, by the processor, solution data from the unstructured field service narrative data, wherein extracting solution data is performed on the unstructured field service narrative data automatically by machine, such that a text representation of the narrative data is processed by machine to distinguish and parse at least one of problem data and solution data from the narrative by the self-training natural language processing algorithms;
   tokenizing, by the processor, the extracted solution data to create word tokens;
   electronically tagging, by the processor, semantic descriptors to the word tokens;
   populating, by the processor, an aircraft service information database used in servicing an aircraft with the extracted problem data, the related extracted solution data, and the semantic descriptors;
   querying, by a terminal, the populated problem data;
   searching, by the processor, the populated problem data queried by the terminal from the aircraft service information database;
   retrieving, by the processor, the related populated solution data from the aircraft service information database;

sending, by the processor, the related populated solution data to the terminal accessed by the user; and displaying, by the terminal, the related populated solution data.

2. The method of claim 1, wherein the step of extracting problem data comprises:

performing a lexical analysis on the collected field service narrative data to identify the lexical class of each of a plurality of parts of speech existing therein;

parsing the collected field service narrative data based at least in part on the identified lexical class of each of the plurality of parts of speech; and extracting the problem data from the narrative data based at least in part on the lexical analysis.

3. The method of claim 2, wherein in the lexical analysis comprises determining one of a metonymy relationship and hyperonomy relationship between tokens.

4. The method of claim 2, wherein in at least one of extracting problem data and extracting solution data from the narrative data comprises analysis of a statistical occurrence of specific words in at least a portion of the narrative.

5. The method of claim 2, wherein the lexical analysis comprises building conceptual vectors from one of the extracted solution data and the extracted problem data.

6. The method of claim 5, wherein an angular distance is determined between a first conceptual vector and a second conceptual vector, where a small angular distance indicates similarity between the first and the second conceptual vector and a large angular distance indicates a dissimilarity between the first and the second conceptual vector.

7. The method of claim 5, wherein contextualization is determined between a first conceptual vector and a second conceptual vector.

8. The method of claim 1, wherein populating an aircraft service information database comprises storing extracted problem data and related extracted solution data.

9. The method of claim 1, wherein the tagging the semantic descriptors is based on conceptual vectors that are defined from aircraft service language semantics.

* * * * *